United States Patent
Kurkowski et al.

[11] 3,952,612
[45] Apr. 27, 1976

[54] REMOTE CONTROL TRIM BALANCER

[76] Inventors: Leonard S. Kurkowski, 822 Koehler Court, San Antonio, Tex. 78223; Clarence C. Burris, Rte. 15, Box 219 C, San Antonio, Tex. 78228

[22] Filed: Feb. 22, 1974

[21] Appl. No.: 445,003

[52] U.S. Cl. ............................. 74/573 R; 73/458; 343/225; 416/145
[51] Int. Cl.² ........................................ F16F 15/10
[58] Field of Search .......... 74/573; 51/169; 73/457, 73/458; 343/225; 416/144, 145; 418/151

[56] References Cited
UNITED STATES PATENTS

| | | | |
|---|---|---|---|
| 3,342,083 | 9/1967 | Kaliszer et al. | 74/573 |
| 3,371,450 | 3/1968 | Board, Jr. et al. | 51/169 |
| 3,698,263 | 10/1972 | Ito | 74/573 |
| 3,827,193 | 8/1974 | Liebman et al. | 74/573 X |

FOREIGN PATENTS OR APPLICATIONS

| 8,672 | 11/1909 | United Kingdom | 74/573 |
|---|---|---|---|

*Primary Examiner*—Samuel Scott
*Assistant Examiner*—F. D. Shoemaker
*Attorney, Agent, or Firm*—Joseph E. Rusz; Julian L. Siegel

[57] ABSTRACT

A system for trim balancing a rotating engine by remote control. A pair of concentric counterweight discs each having lightening holes to render the discs weighted to one side and these unbalanced discs are positioned in the spinning hub of a rotating engine. Control signals are transmitted to activate a pair of servo motors each controlling the angular position of one counterweight disc. The angular position of the discs with respect to each other can be controlled as well as the angular position of the pair of discs taken together with respect to the rotating engine.

3 Claims, 5 Drawing Figures

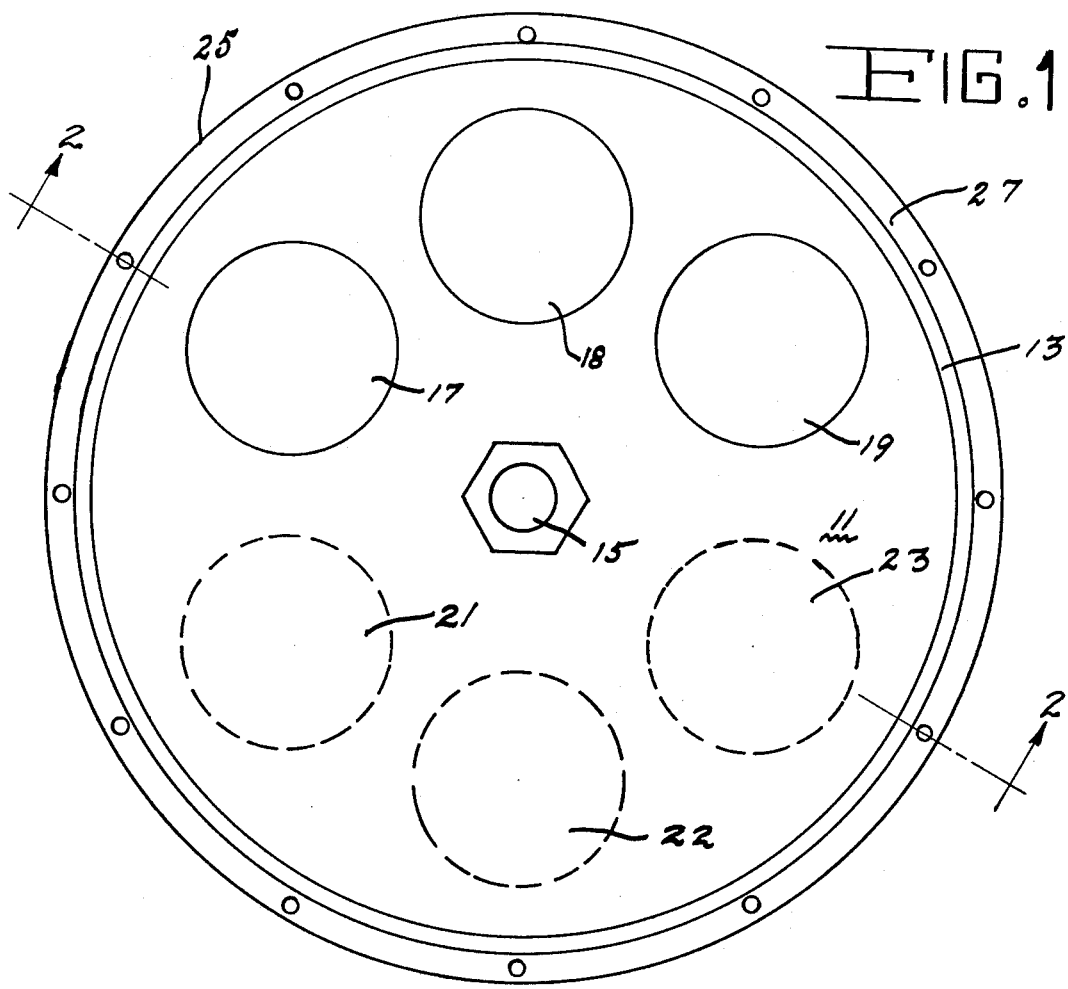
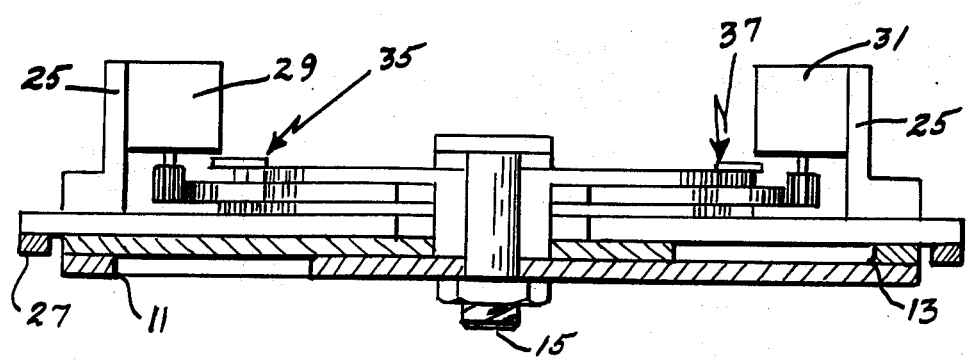

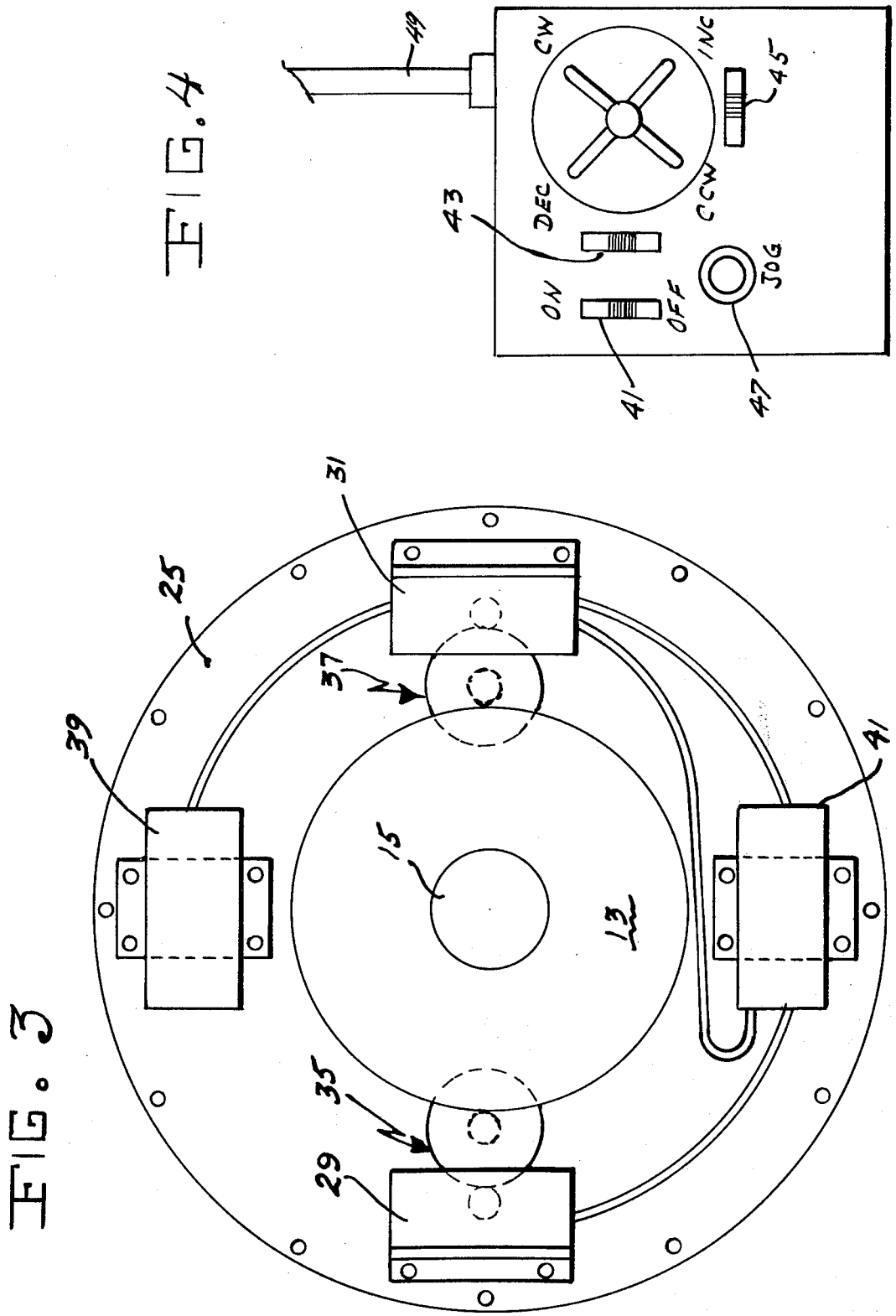

REMOTE CONTROL TRIM BALANCER

BACKGROUND OF THE INVENTION

This invention relates to balancing rotating bodies, and more particularly to trim balancing rotating engines by remote control.

There is a need in the art to balance rotating engines such as the turbo fan type in order to reduce or eliminate vibrations. It is desirable to perform this balancing while the engine is in motion rather than stopping the engine and adding the counterweights and then restarting the engine to check the balance.

The present invention performs the abovementioned need by shifting counterweight discs angularly upon remote control command signals.

SUMMARY OF THE INVENTION

A radio control system is used to command two counterweight discs adapted to the spinner hub of a turbo fan engine for trim balancing the fan. The remote control system is installed in the spinner hub of the engine and the imbalance is minimized while the engine is in operation.

The position of the counterweight discs in relation to each other determines the amount of imbalance and the position of both discs taken as a whole in relation to the spinner hub determines the angle of imbalance. The position of the discs is directly correlated to the size and position of the permanent weight required. The radio control system provides four commands to the discs positioning servo motors, which are increase in weight, decrease in weight, clockwise shift of the weight, and counterclockwise shift of the weight.

It is therefore an object of the invention to provide a more novel and improved system for balancing a turbo fan engine.

It is another object to provide a system of trim balancing a rotary engine thereby eliminating the need of rotating and positioning of fixed counterweights.

It is still another object to provide a system of trim balancing a rotating engine by remote control while the engine is operating at normal speeds.

These and other objects, features and advantages of the invention will become more apparent from the following description taken in connection with the illustrative embodiment in the accompanying drawings.

DESCRIPTION OF THE DRAWINGS

FIG. 1 is a front view of the counterweight disc balancing system.

FIG. 2 is a sectional elevation view of the counterweight disc balancing system taken along lines 2—2 of FIG. 1;

FIG. 3 is a rear view of the counterweight disc balancing system;

FIG. 4 shows the controls necessary to operate the counterweight discs by remote control.

DETAILED DESCRIPTION OF THE PREFERRED EMBODIMENT

Figure 5:
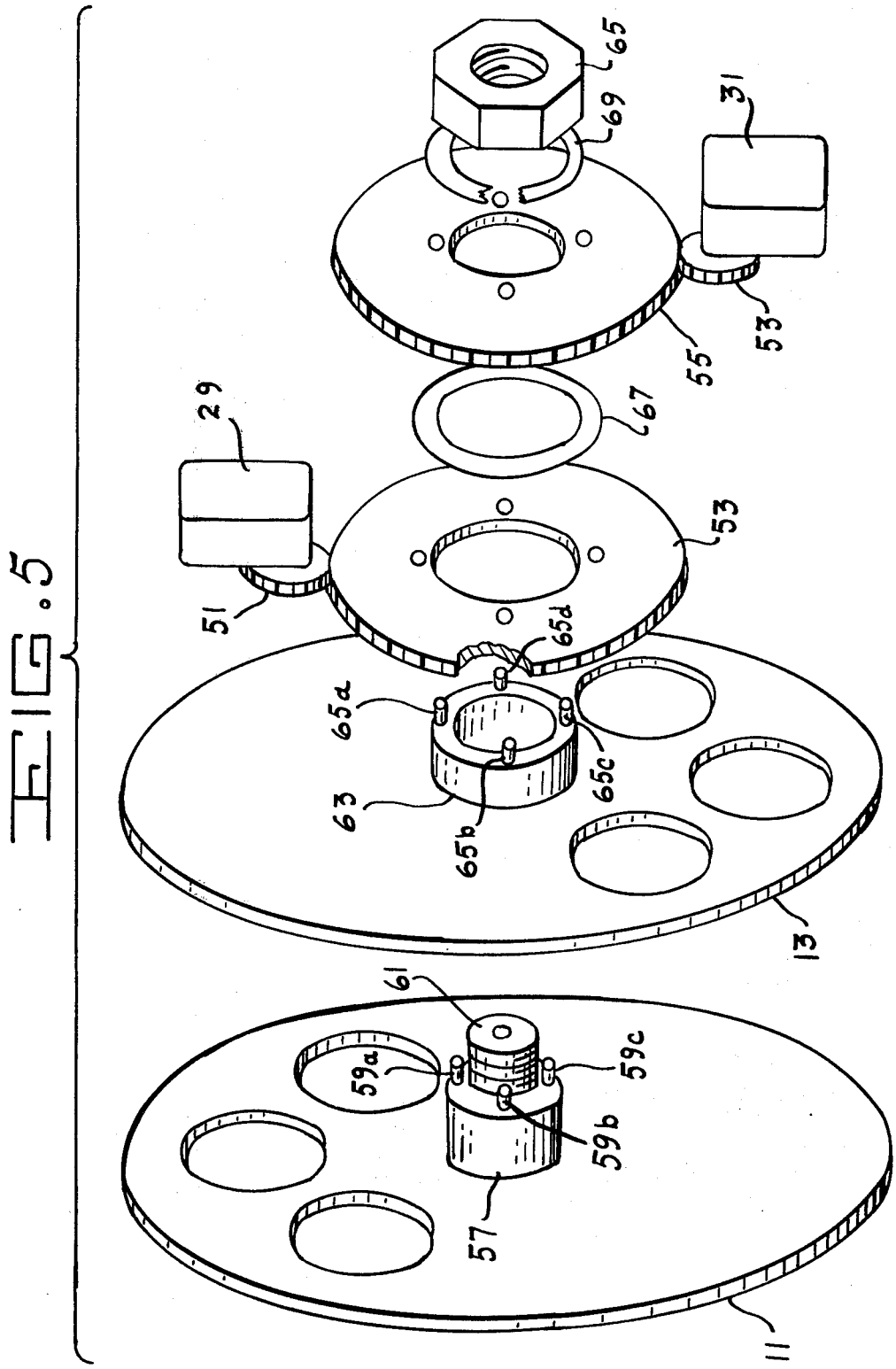
FIG. 5 shows an exploded view of the gear train with the counterweight discs.

Referring to FIG. 1, there is shown the pair of counterweight discs 11 and 13 which can be mounted in the hub of a rotating engine, such as a turbo fan. Disc 11 is concentric with disc 13 which lies immediately below it and both rotate on spindle 15. Lightening holes 17 to 19 are placed in disc 11 and positioned together in one-half of the disc. The same is true for lightening holes 21 to 23 in disc 13. The positions of the disc can be altered to change the weight distribution of the discs with respect to each other. As shown, the lightening holes of disc 11 oppose the lightening holes of disc 13 thereby creating an even distribution of weight. The discs can be rotated in order to have the lightening holes coincide. This would create a strong imbalance of the pair of discs which may be necessary to trim balance a turbo fan which would otherwise be strongly out of balance. Also, the position of both discs moving together can be controlled in order to effect a weight imbalance of the pair of discs in relation to the rotary engine. Attaching plate 25 is used to mount the trim balance system to the rotary engine and antenna 27 is mounted upon attaching plate 25.

FIG. 2 is a side view of the trim balance system which shows servo motors 29 and 31 which are attached to mounting bracket 25. Servo motors 29 and 31 are connected to the counterweight discs through gear trains 35 and 37. Counterweight discs 11 and 13 are locked to the drive gears by dowel pins.

FIG. 3 shows the back view of the trim balancer. Servo motors 27 and 31 are mounted opposite each other and controlling the angular position of counterweight discs 11 and 13 through gear trains 35 and 37. Power is supplied by battery 39 which is mounted opposite receiver 41 on attaching plate 25.

FIG. 4 shows the transmitter controls for trim balancing a rotating engine by remote control. Power is supplied with on-off switch 41. Four commands are provided for positioning the disc servo motors, which are increase in weight, decrease in weight, clockwise shift of the weight, and counterclockwise shift of the weight, using controls 43 and 45 and jog control 47 for small corrections. The control signals are transmitted from antenna 49. An exploded view of the gear train showing their operation upon the counterweight discs is shown in FIG. 5. Servomotors 29 and 31 cause the rotation of drive gears 51 and 53 which then cause driven gears 53 and 55 to rotate. Counterweight disc 11 includes axial shaft 57 having dowels 59a–59d (dowel 59d not shown) attached thereto. Shaft 57 is terminated with threaded member 61. Counterweight discs 13 include cylindrical shaft 63 with dowels 65a–65d attached thereto. Shaft 57 is adapted to be inserted into cylindrical shaft 63 thereby making shafts 57 and 63 coaxial. Dowels 65a–65d are inserted into the dowel holes of gear 53 causing counterweight disc 13 to rotate upon activation of servo member 29. Dowels 59a–59d are inserted into dowel holes of gear 55 causing counterweight disc 11 to rotate upon activation of servomotor 31. The gear system is secured by attaching threaded nut 65 to threaded member 61. Spacer 67 is interposed between gears 53 and 55 and spacer 69 is interposed between gear 55 and threaded nut 65.

To use the remote control balance, the unit is installed in the hub of the engine fan, the unit is turned on, the engine started as the speed is increased, the amount of imbalance is minimized by commanding the counterweight discs with the remote control transmitter. The vibration is monitored by conventional vibration readout equipment while the counterweights are positioned to decrease the vibration level to a minimum.

The present invention can be used to trim balance a turbo engine in testing by accurately locating the angle and amount of counterweight required and then placing permanent counterweights in the indicated location. It is also possible to install this system as a permanent part of the spinner assembly, commandable at any time. By modification of the mounting plate the trim balancer could be adaptable to other fan engines or other engine rotating components. It is useable on a Gisholt balancing machine prior to engine buildup. The counterweight discs can be manufactured from SAE-321 stainless steel. Other mounting and support hardware can be manufactured from SAE-6061 aluminum of minimum weight.

The transmitter-receiver servo arrangement is well known in the radio control of model aircraft and is discussed in any of several model magazines, such as *Model Airplane News*.

What is claimed is:

1. A system for controlling the balance of a rotating body comprising:
   a. a first counterweight disc mounted at the hub of a fan and having a plurality of holes;
   b. a second counterweight disc mounted concentrically with the first disc and having a plurality of holes;
   c. means for positioning the holes of the first and second discs with respect to each other and with respect to the hub of a fan;
   d. a transmitter for communicating positioning signals to the positioning means; and
   e. a receiver for receiving positioning signals from the transmitter, the receiver being connected to the positioning means.

2. A system for controlling the balance of a rotating body according to claim 1 wherein the positioning means comprise:
   a. first and second servo motors connected to the receiver; and
   b. first and second gear trains interposed between the first and second counterweight discs and the first and second servo motors.

3. A system for controlling the balance of a rotating body according to claim 2 wherein the first and second counterweight discs have circular holes positioned toward the periphery of the discs and clustered into one half of the discs.

* * * * *